Figure 1:
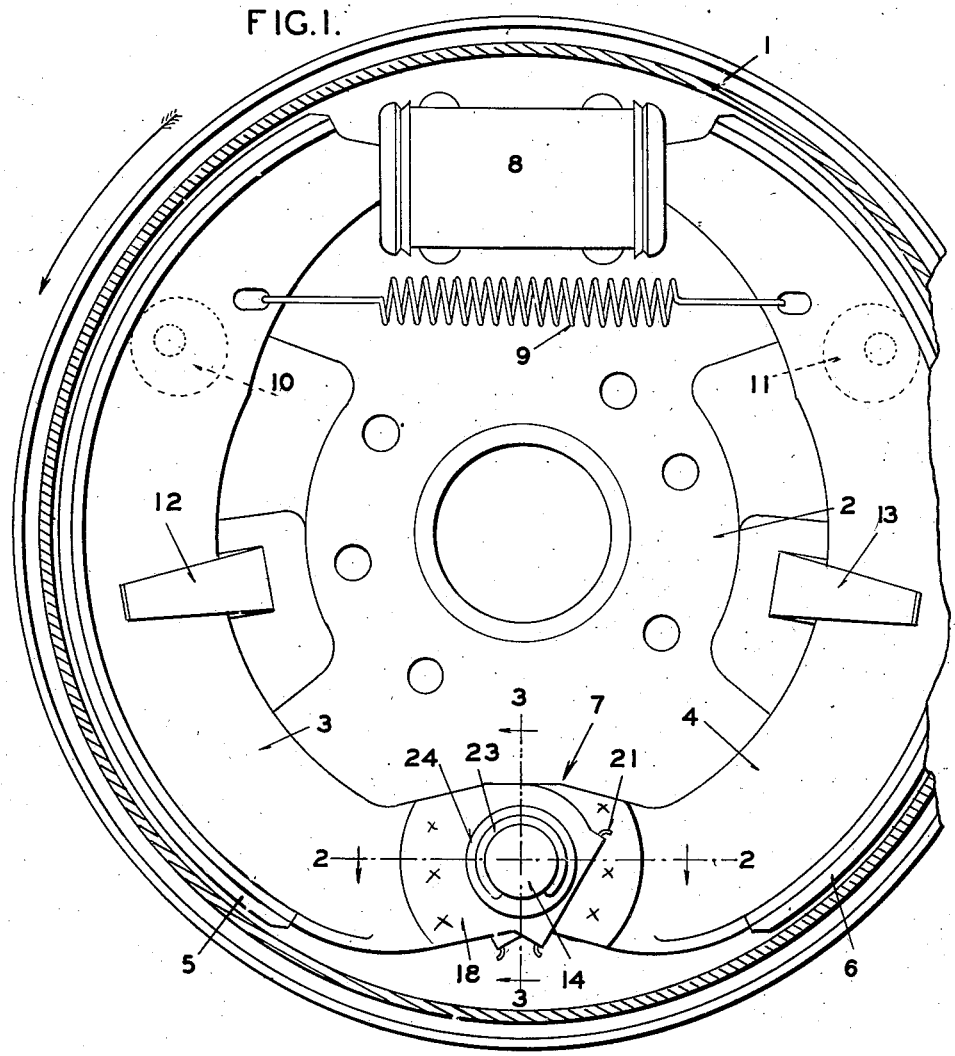

June 25, 1940.   S. SCHNELL ET AL   2,205,439
BRAKE SHOE MOUNTING
Filed June 14, 1939   2 Sheets-Sheet 1

INVENTORS
STEVE SCHNELL
BURNS DICK
BY
*E. E. Huffman*
ATTORNEY

June 25, 1940. S. SCHNELL ET AL 2,205,439
BRAKE SHOE MOUNTING
Filed June 14, 1939 2 Sheets-Sheet 2
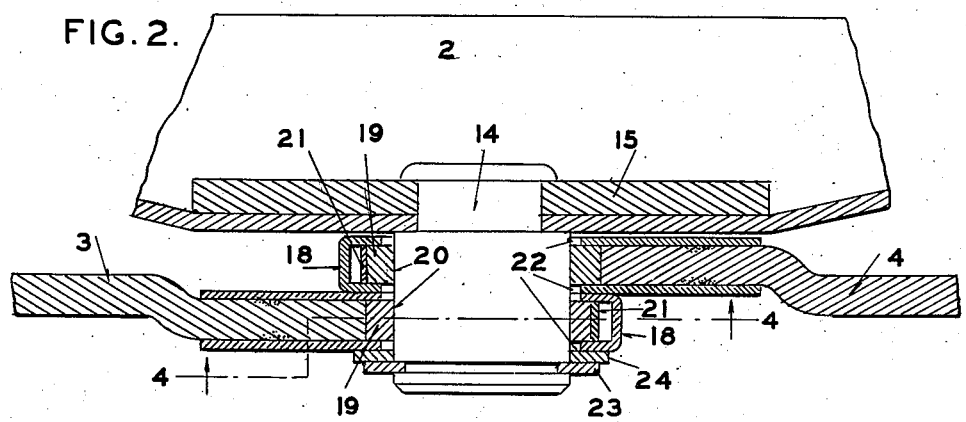
FIG. 2.
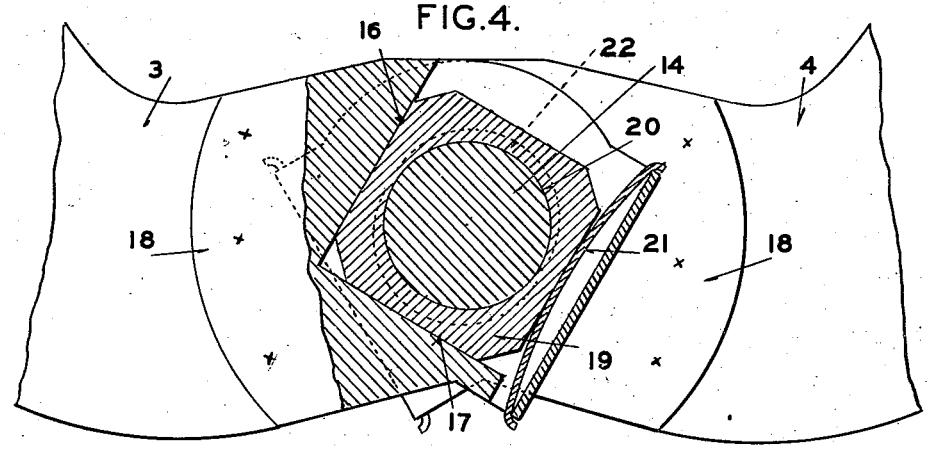
FIG. 4.
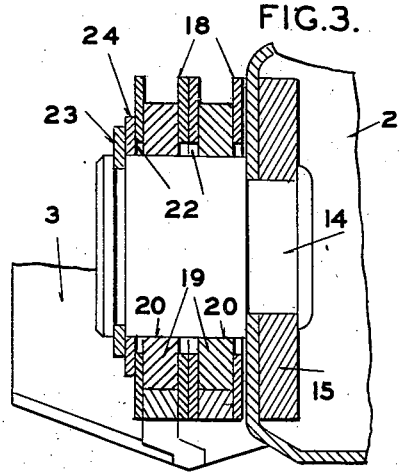
FIG. 3.
INVENTORS
STEVE SCHNELL
BURNS DICK
BY
ATTORNEY Patented June 25, 1940

2,205,439

UNITED STATES PATENT OFFICE 2,205,439

BRAKE SHOE MOUNTING

Steve Schnell, Overland, and Burns Dick, Ferguson, Mo., assignors to Wagner Electric Corporation, St. Louis, Mo., a corporation of Delaware Application June 14, 1939, Serial No. 279,099

10 Claims. (Cl. 188—79.5)

Our invention relates to braking apparatus and more particularly to a mounting for a brake shoe or its equivalent.

One of the objects of our invention is to provide an improved means for mounting a brake shoe on a support and permitting its automatic adjustment toward the drum as the lining wears.

Other objects of our invention are to provide a brake shoe mounting of the kind described which is compact and simple in construction, efficient in operation, economical to manufacture and one in which the frictional adjustment of the parts is not affected by the pivotal movement of the shoe and also one which does not restrain free pivotal movement of said shoe.

Further objects of our invention will become apparent from the following description taken in connection with the accompanying drawings in which Figure 1 is a view of a brake assembly having our invention embodied therein; Figure 2 is a cross-sectional view taken on the line 2—2 of Figure 1; Figure 3 is a cross-sectional view taken on the line 3—3 of Figure 1; and Figure 4 is a cross-sectional view taken on the line 4—4 of Figure 2.

Referring to the drawings in detail, numeral 1 indicates the usual brake drum secured to a rotating member such as the vehicle wheel and 2 the support or backing plate secured to a fixed member. Within the drum are two shoes 3 and 4 provided with linings 5 and 6 each having their lower ends pivotally mounted on the backing plate by our improved mounting means generally indicated by the numeral 7. The upper adjacent ends of the shoes are actuated into engagement with the drum by the fluid motor 8 connected to a suitable source of pressure such as a master cylinder (not shown. A spring 9 normally holds the shoes 3 and 4 disengaged from the drum and against the adjustable "off" position stops 10 and 11. There is also provided leaf spring guides 12 and 13 carried by the backing plate for resiliently holding the shoes against the backing plate.

Our improved mounting means 7 employs a single anchor pin 14 permanently secured to the backing plate which is reenforced by a plate 15. The end constructions of both shoes are identical and although each is mounted on the single anchor pin, it is to be understood that individual anchor pins can be employed for each shoe if desired.

As best shown in Figure 4, each shoe end has its web portion notched to form an abutment surface 16 and a surface 17 at right angles thereto. The web portion has secured thereto, as by welding, a U-shaped member 18 which is so shaped and mounted on the shoe that it will form with the notched end of the shoe a rectangular pocket open at the top. Within this pocket is positioned a square block or bearing member 19 having a central hole 20 for pivotal mounting on the anchor pin 14. The width of the block is less than the width of the pocket between surface 16 and the closed end portion of the U-shaped member and carried by the closed end portion of the U-shaped member is a leaf spring 21 for biasing the abutment surface 16 on the notched end of the shoe into engagement with the adjacent surface of the block to thus establish a frictional resistance to their relative movement. The construction is such that the shoe can move outwardly toward the drum relative to the block and the friction is sufficient to maintain the adjusted position between the shoe and the block. The legs of the U-shaped member are provided with oversize openings 22 through which the anchor pin extends. The blocks and the shoe ends are held on the anchor pin by a C-washer 23, there being a washer 24 between this C-washer and the outer shoe.

In operation when the brake is applied, the fluid motor 8 is actuated to move the shoe into engagement with the drum. With the drum rotating in the direction of the arrow, the "forward" shoe 3 will anchor on pin 14 through the abutment surface 16 and the block 19. The abutment surface 16 on the "reverse" shoe 4 will be held in engagement with its block 19 by the actuating force from the fluid motor. The heel end of shoe 3 will be forced into engagement with the drum by the actuating force and the drag on the brake shoe, and the heel end of shoe 4 will be forced into engagement with the drum by the actuating force if such force is great enough to overcome the friction created by the leaf spring 21. The friction between the abutment surface 16 and the block created by the spring 21 will be sufficient to maintain the position assumed by the shoe with respect to the anchor pin. As the brake lining 5 of shoe 3 wears, the heel end of this shoe will be moved relative to the block by the drag on the brake shoe during braking action and this adjustment will be maintained by the friction action. The adjustment will not be altered when shoe 5 is released from the drum since the release movement will be by a pivoting of the shoe around the anchor pin, which movement will be sufficient to free the lining over the entire surface of the shoe from the drum in the same manner as though the shoe were directly pivoted on the anchor pin. As the lining 6 on the "reverse" shoe 4 wears, the adjustment will be the same as shoe 3 as the actuating force produced by the fluid motor 8 is generally great enough to cause relative movement between the shoe and the block. When the direction of rotation of the drum is reversed, shoe 4 will become the "forward" shoe and shoe 3 the "reverse" shoe and the adjustment of shoe 4 will then be the same as that previously described with respect to shoe 3 and shoe 3 will be the same as that previously described with respect to shoe 4.

It is to be noted that the mounting for the shoe permits the heel end of each shoe to be independently adjusted with respect to the other. The shoes are not tied together at the anchor pin. The friction maintained between the abutment surface 16 and the block does not in any way affect the pivotal movement of the shoe nor does the pivotal movement of the shoe to engage and disengage it from the drum in any way change the intensity of the friction action which will always remain the same as predetermined by the strength of spring 21. The washer 24 and the C-washer 23 which are employed to hold the shoes on the anchor pin also do not affect the free turning movement of the shoes on the pin as these members do not have any clamping effect on the shoes.

It is also to be noted that the construction is very simple and easy to manufacture. The hole 20 is at the center of the block, thus simplifying the manufacture of this member. The force created by the leaf spring need not be accurate, only greater than that necessary to maintain the shoe in any adjusted position it may assume relative to the block 19. The construction also permits the anchor pin to be permanently and rigidly secured to the backing plate since it is unnecessary to move the pin to make any adjustment due to the automatic adjustment present throughout the life of the linings.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In braking apparatus embodying a brake drum, a friction element and a support for the friction element, means for mounting one end of the friction element on the support and permitting its automatic adjustment toward the drum, said means comprising a member mounted on the support for pivotal movement only and provided with a flat abutment surface, means at the end of the friction element providing a flat abutment surface for engaging the flat abutment surface on the member, said abutment surfaces permitting the element to move toward the drum relative to the member by force effective on the element during brake application when the brake lining thickness at the end of the element wears, and cooperating means between the element and the member for establishing a frictional engagement between the flat abutment surfaces for maintaining said surfaces in adjusted position.

2. In braking apparatus embodying a brake drum, a brake shoe and a support for the brake shoe, brake shoe mounting and adjusting means comprising an anchor pin carried by the support, a member provided with a plane surface and mounted on the pin for pivotal movement only, means forming a plane abutment surface on the end of the shoe for engaging the plane surface on the member and permitting the shoe end to move toward the drum and relative to the member by force effective on the shoe during braking application when the brake lining thickness at the end of the shoe is reduced by wear, and means independent of the anchor pin and cooperating with the shoe and the member for frictionally maintaining the shoe end in adjusted position with respect to the member.

3. In braking apparatus embodying a brake drum, a brake shoe and a support for the brake shoe, brake shoe mounting and adjusting means comprising an anchor pin carried by the support, a block mounted on the pin for pivotal movement only, means forming a slot in the end of the shoe for receiving the block and permitting the shoe end to abut the block and to move toward the drum and relative to the block by force effective on the shoe during braking application when the brake lining thickness at the end of the shoe is reduced by wear, and means independent of the anchor pin and cooperating with the shoe and the block for frictionally maintaining the shoe end in adjusted position with respect to the block.

4. In braking apparatus embodying a brake drum, a brake shoe support and a brake shoe having a flat abutment surface on its end, brake shoe mounting and adjusting means comprising an anchor pin carried by the support, a block mounted on the pin for pivotal movement only, means forming a slot in the end of the shoe for receiving the block and permitting the flat surface on the shoe end to engage a flat surface of the block and to permit the shoe end to move toward the drum and relative to the block by force effective on the shoe during braking application when the brake lining thickness at the end of the shoe is reduced by wear, and a spring carried by the shoe for forcing the flat abutment surface on the shoe into frictional engagement with the flat surface of the block and to maintain the shoe end in adjusted position with respect to the block.

5. In braking apparatus embodying a brake drum, a brake shoe and a support for the brake shoe, brake shoe mounting and adjusting means comprising an anchor pin carried by the support, a member mounted on the pin for pivotal movement only and provided with a flat surface, means forming a flat abutment surface on the end of the shoe for engaging the flat surface of the member, a U-shaped member secured to the end of the shoe and surrounding the member, said shoe end being permitted to move toward the drum and relative to the member by force effective on the shoe during braking application when the brake lining thickness at the end of the shoe is reduced by wear, and a spring interposed between the closed end of the U-shaped member and the pivoted member for forcing the flat abutment surface on the shoe into frictional engagement with the flat surface on the pivoted member to maintain the shoe end in adjusted position with respect to the member.

6. In braking apparatus embodying a brake drum, a brake shoe and a support for the brake shoe, brake shoe mounting and adjusting means comprising an anchor pin carried by the support, a member mounted on the pin for pivotal movement only and provided with a flat surface, means forming a flat abutment surface on the end of the shoe for engaging the flat surface of the member, a U-shaped member secured to the end of the shoe and surrounding the member, said shoe end being permitted to move toward the drum and relative to the member by force effective on the shoe during braking application when the brake lining thickness at the end of the shoe is reduced by wear, and a leaf spring carried by the U-shaped member for forcing the flat abutment surface on the shoe into frictional engagement with the flat surface on the pivoted member to maintain the shoe end in adjusted position with respect to the member.

7. In braking apparatus embodying a brake drum, a brake shoe and a support for the brake shoe, brake shoe mounting and adjusting means comprising an anchor pin carried by the support, a U-shaped member attached to the end of the shoe, said shoe end being notched to provide with the U-shaped member a pocket, a block positioned in the pocket and mounted for pivotal movement only on the anchor pin, one surface of the block and a surface of the notched end of the shoe opposite the closed end of the U-shaped member being in abutting relation, and a spring interposed between the closed end of the U-shaped member and the block for maintaining the abutting surfaces in frictional engagement and the shoe end in adjusted position.

8. In braking apparatus embodying a brake drum, a brake shoe and a support for the brake shoe, brake shoe mounting and adjusting means comprising an anchor pin carried by the support, a U-shaped member attached to the end of the shoe, said shoe end being notched to provide with the U-shaped member a pocket, a block positioned in the pocket and mounted for pivotal movement only on the anchor pin, one surface of the block and a surface of the notched end of the shoe opposite the closed end of the U-shaped member being in abutting relation, and a bowed leaf spring carried by the closed end of the U-shaped member and interposed between it and the block for forcing the abutting surfaces into tight frictional engagement and maintaining the shoe end in adjusted position.

9. In braking apparatus comprising a brake drum, a brake shoe and a support therefor, brake shoe mounting and adjusting means permitting pivotal movement of the shoe and automatic adjustment of the shoe toward the drum under conditions of lining wear, said means comprising an anchor pin carried by the support, a block pivotally mounted on the anchor pin, and a plane abutment surface on the shoe engaging the block and slidable thereon whereby the pivoted end of the shoe may be adjusted toward the drum by force effective on the shoe during brake application when the brake lining thickness on said end of the shoe is reduced by lining wear, the position of the shoe surface which engages the block being such that an extension thereof passes to that side of the drum centre remote from the shoe, and friction means preventing the shoe end from returning to a position occupied prior to an adjustment.

10. In braking apparatus embodying a brake drum, a brake shoe and a support for the brake shoe, brake shoe mounting and adjusting means comprising an anchor pin carried by the support, a block mounted on the pin for pivotal movement only, means forming a slot in the end of the shoe for receiving the block and permitting the shoe end to abut the block and anchor on the pin and also permitting the shoe end to move toward the drum and relative to the block, and spring means cooperating with the shoe and the block for frictionally maintaining the shoe end in position on the block, said spring being independent of anchor pin and not restraining free pivotal movement of the block on the pin.

STEVE SCHNELL.
BURNS DICK.